United States Patent [19]

Tucoulat

[11] Patent Number: 5,060,546
[45] Date of Patent: Oct. 29, 1991

[54] METHOD AND APPARATUS FOR CUTTING IRRADIATED FUEL ELEMENTS IN THE HORIZONTAL POSITION BY MEANS OF A BLADE-CARRYING CARRIAGE

[75] Inventor: Daniel Tucoulat, Cormeilles en Parisis, France

[73] Assignee: Societe Generale Pour Les Techniques Nouvelles, France

[21] Appl. No.: 156,320

[22] Filed: Feb. 16, 1988

[30] Foreign Application Priority Data

Feb. 17, 1987 [FR] France ............................. 87 02027

[51] Int. Cl.$^5$ .......................... B26D 7/02; B26D 7/06
[52] U.S. Cl. ......................................... 83/19; 83/42;
83/167; 83/176; 83/276; 83/437; 83/622; 83/930
[58] Field of Search ...................... 83/19, 39, 42, 167, 83/176, 276, 713, 719, 437, 452, 613, 618, 620, 622, 925 R, 930

[56] References Cited

U.S. PATENT DOCUMENTS

| | | | |
|---|---|---|---|
| 3,621,742 | 11/1971 | Kendall | 83/620 X |
| 3,672,247 | 6/1972 | Cherel | 83/35 |
| 3,763,770 | 10/1973 | Ehrman et al. | 83/19 X |
| 4,091,699 | 5/1978 | Chaze et al. | 83/56 |
| 4,510,832 | 4/1985 | Guilloteau | 83/168 |
| 4,528,879 | 7/1985 | Eisenacher | 83/278 |

FOREIGN PATENT DOCUMENTS 2064403 6/1981 United Kingdom .

Primary Examiner—Hien H. Phan
Assistant Examiner—Eugenia A. Jones
Attorney, Agent, or Firm—Louis Weinstein

[57] ABSTRACT

The invention relates to a method and to apparatus for cutting irradiated fuel elements when in the horizontal position. A fuel element is placed on a support and presents a cross-section for cutting. The fuel element may be displaced along its longitudinal axis. In the immediate proximity of the cutting section, the fuel element is compressed by at least one side clamp, and between two cuts the side clamp(s) is/are unclamped, the fuel element is then advanced by a desired length, and the side clamp(s) is/are reclamped. The end pieces cut off by end piece cutters fall into a fixed end piece removal apparatus. The rods are cut up inside a cavity in such a manner as to confine the cut-off lengths therein, the cavity being provided with a bottom opening enabling the cut-off lengths to be removed and directed towards a fixed rod-removal apparatus. In a preferred embodiment, the end pieces are cut off against the front face of the carriage which carries the rod-cutting blade.

34 Claims, 9 Drawing Sheets

METHOD AND APPARATUS FOR CUTTING IRRADIATED FUEL ELEMENTS IN THE HORIZONTAL POSITION BY MEANS OF A BLADE-CARRYING CARRIAGE

The invention relates to a method and to apparatus for cutting irradiated fuel elements (the method being sometimes referred to as "shearing" and the apparatus being sometimes referred to as a "shear"), with the fuel elements being in the horizontal position while they are being cut.

BACKGROUND OF THE INVENTION

After being used in a reactor, irradiated fuel elements are deactivated and then transported to reprocessing installations where they are stored and then subjected to various processes in order to extract the radioactive materials which are then confined and stored in accordance with the applicable safety regulations in order to protect the population and the environment.

Regardless of the type of reactor concerned, (Pressurized Water Reactor PWR, Boiling Water Reactor BWR, etc.) each fuel element comprises two metal parts referred to as "end pieces" and a plurality of fuel rods held therebetween.

For example, in a PWR, there are several hundred fuel rods each of which is constituted by a fuel-containing metal tube which is several meters long and 1 cm to 1.5 cm in diameter, with said tubes being held mutually parallel by transverse metal spacers and having their ends engaged in respective end pieces, and with the cross-section of an entire fuel element being, for example, a square having a side of about 30 cm.

The first reprocessing stage consists in cutting up the fuel element in a shearing cell, with the end pieces being cut off and the rods being cut up. The resulting cut-up rods are sent to a dissolver in which hot nitric acid dissolves the fuel while leaving the metal parts intact.

In order to avoid damage to the dissolver, and in order to avoid clogging it up pointlessly, the end pieces are removed separately from the rods and taken to a specific processing location (for washing, compacting, encasing, etc.).

A first way of doing this consists in cutting off the end pieces and cutting up the rods in different locations. Thus, French patent number 1,587,331 describes the two end pieces being sawn off at a sawing station with the fuel element then being displaced on swing-trays to bring them to the rod cutting-up station. In this way, the end pieces and the rods are removed separately.

In order to avoid the need to displace the fuel element without its end pieces, which requires special precautions to be taken in order to hold the rods together, French patent number 75-27 897 describes a method and an associated apparatus applicable to intact fuel elements (whose end pieces have not been previously removed therefrom), in which method the first end piece (the one closest to the cutting section) is separated from the rods, the rods are then cut up, and the last end piece is then removed, with the same blade being used for cutting off the end pieces and cutting up the rods and with the same opening being used for their removal.

BRIEF DESCRIPTION OF THE DRAWINGS

This embodiment will be better understood from the following figures.

MORE DETAILED DESCRIPTION OF THE PRIOR ART

French patent number 75-27 897 is applicable to cutting up fuel elements in the vertical position or in the horizontal position.

Figure 1:
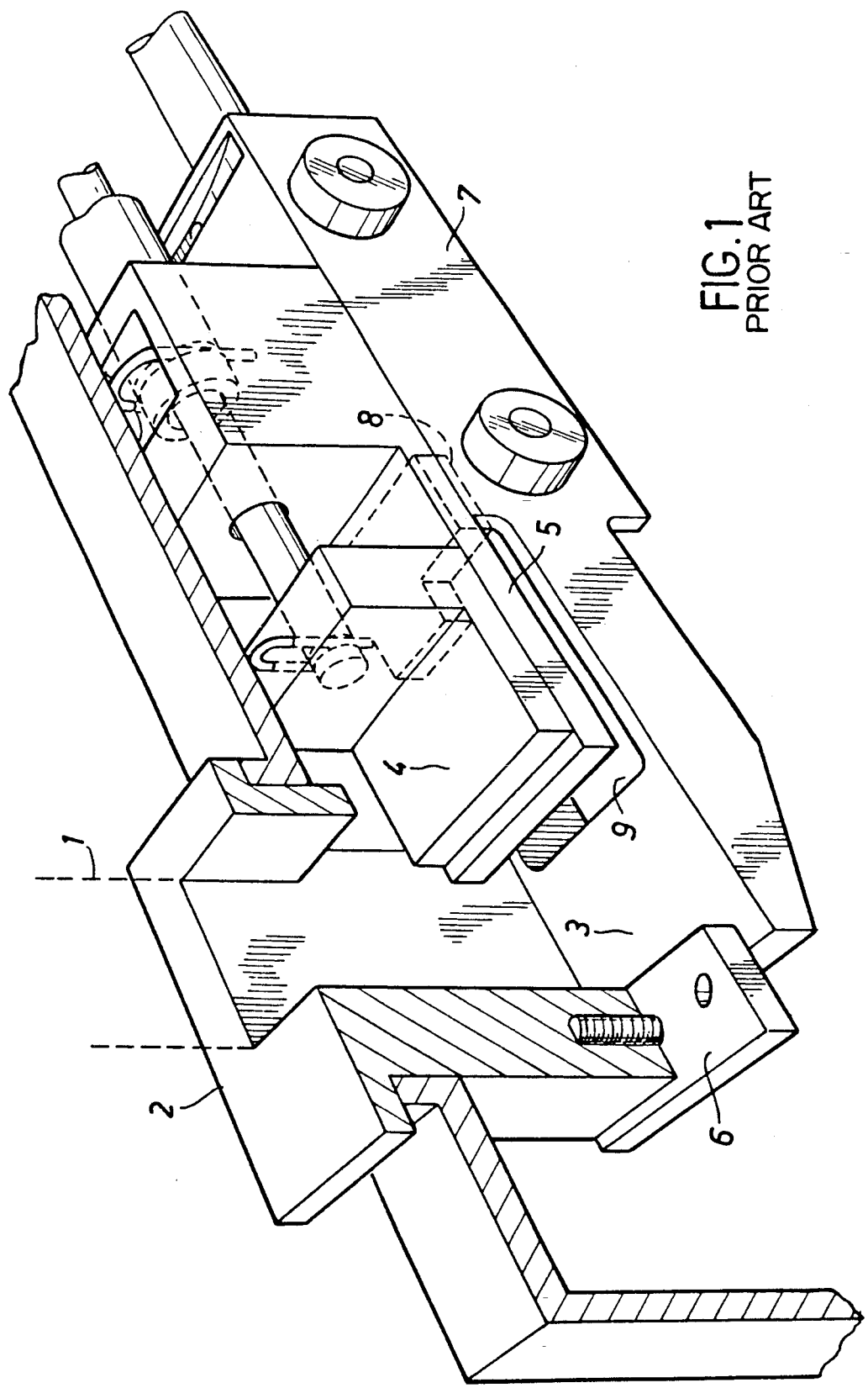
FIGS. 1 and 2 show the technique taught by French patent number 75-27 897.
Figure 2:
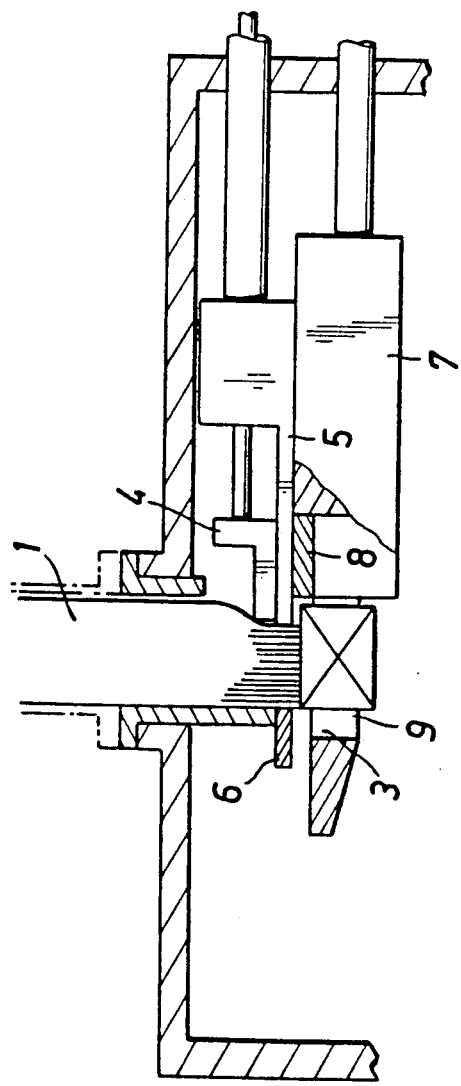

More precisely, FIGS. 1 and 2 which illustrate said patent show an intact fuel element 1 which is inserted vertically into a guide duct 2 provided with means for retaining and displacing the fuel element, with the element bearing against a safety plate 3. The fuel element is then clamped by means of two side clamps 4 and 5 which press it against a backing blade or anvil 6 fixed to the guide duct, with the so-called "auxiliary" side clamp 4 which is furthest from the cutting section being activated initially in order to exert sufficient thrust to limit the curvature of the fuel element, and with the so-called "main" side clamp 5 then being actuated so as to press the rods against one another in the vicinity of the cutting section. A blade-carrying carriage 7 which runs on rails situated beneath said carriage is then displaced so that the blade 8, co-operating with the backing blade 6, cuts the fuel element: the top surface of the blade 8 is then substantially at the same level as the bottom surface of the backing blade 6. The carriage 7 returns to its initial position so that the safety plate 3 is again beneath the element, the side clamps are unclamped, the element is advanced by the desired length, the side clamps are re-clamped, and a new cutting operation takes place, etc.

The end pieces and the cut-off lengths of rod fall through an opening 9 situated ahead of the cutting blade, and in FIG. 1 this opening is made through the same metal part as constitutes the safety plate, with the opening being located in this case between the safety plate and the blade. It is then necessary to provide means beneath the opening for removing end pieces in one direction and rods in another direction.

In current installations, at least one of these removal means is movable. Thus, for example, the means for removing the end pieces is constituted by a removable slide placed over the means for removing the cut-off lengths of rod which means is fixed and connected to the dissolver. When cutting off an end piece, the slide is placed over the means for removing the rods and closes access thereto. The cut-off end piece falls into the slide, the slide is moved, thereby providing access to the means for removing rods, the rods are cut up, and the slide is replaced in order to recover the other end piece.

The slide moves on running means (rails, . . . ). However, when using apparatus as described in French patent number 75-27 897 to cut rods, it may happen that splinters of metal and dust (of fuel or of metal) are projected around the blade and collect in the vicinity of the running means, thereby impeding displacement of the slide and also of the blade-carrying carriage.

SUMMARY OF THE INVENTION

In order to remedy these drawbacks, the invention provides a method and an associated apparatus in which the removal means are fixed and in which the rods are confined in a cavity during cutting.

More precisely, the present invention provides a method of cutting an irradiated fuel element comprising fuel rods placed between two end pieces, wherein the fuel element is maintained on a support in the horizontal position in order to present its cross-section for cutting, said element being displaceable in desired lengths along its longitudinal axis, the element also being compressed in the immediate vicinity of the cutting section by means of at least one side clamp, cutting being performed by cutting means which are displaced substantially perpendicularly to the longitudinal axis of the element and which co-operate with a fixed backing blade, with the side clamp(s) being unclamped between two cutting actions, with the element being advanced by the desired length to be cut off, and with the side clamp(s) being reclamped, the method being characterized in that:

the, or each, end piece is cut off by end piece cutting means, said end pieces falling into fixed end piece removal means;

the rods are then cut up by rod-cutting means, cutting being performed in such a manner that the cutting section of the rods lies within or at the limit of a cavity such that the cut-off lengths of rod are confined within said cavity; and the cut-off lengths of rod are removed and directed towards rod removal means via a bottom opening of the cavity, said removal means being fixed.

In said method, the element has one or both of its end pieces removed and then the rods are cut up in the cavity. The two end pieces may be separated by any cutting means suitable for cutting off the end pieces and then cutting up the rods.

The means for removing the end pieces and for removing the rods are distinct from each other and are situated in fixed manner beneath the respective cutting means so that the end pieces and the rods fall into them respectively.

In a particularly advantageous disposition, the first end piece is cut off by the end piece cutting means, the rods are cut up by the rod cutting means, and then the second end piece is recovered.

In this case, the element is cut at a single station, i.e. it is not transported between one station for cutting off the end piece and another station for cutting up the rods: the element is placed on the single support and it is moved solely by displacement along its longitudinal axis, with the cutting means being the movable means.

In this preferred method:

the first end piece is cut off by the front edge of a carriage for carrying an end piece cutting blade, said edge constituting the end piece cutting blade and co-operating with an end piece cutting backing blade which is fixed during cutting, said carriage moving over the end piece removal means;

the fuel element is then advanced so as to insert its cross-section over a length equal to the rod cut-off length within a cavity in the carriage for carrying the rod-cutting blade;

the fuel rods are cut during displacement of the carriage for carrying the rod-cutting blade by a rod-cutting blade which is fixed in said cavity and which co-operates with a rod-cutting backing blade which is fixed during cutting in such a manner that the rod-cutting section lies within or is at the limit of the cavity; and the cut-up rods are removed and directed to the rod removal means via a bottom opening in the cavity, with said rod removal means being fixed.

MORE DETAILED DESCRIPTION OF THE METHOD INVENTION

The method will be better understood from the following description of the successive operations performed on a fuel element to be cut up once it has already been taken from a storage location and placed in the shearing station.

1/Placing the element in the cutting position.

The element is placed horizontally on a support and is held rigidly thereon so as to enable displacement thereof along its longitudinal axis while preventing any lateral displacement.

The support may simply be a table provided with guide means, or else it may be a guide duct, for example. An advantageous guide means that may also constitute the support is a magazine constituted by rigid metal plates which are open at at least one end via which the fuel element is inserted. The magazine has the advantage, when independent from the cutting apparatus, of being displaceable and in particular of being usable for transporting the element from its storage location, in which it is in a vertical position, to the shearing location (in which it is in a horizontal position), and therefore of being capable of being disposed in any position.

The means for displacing the element along its longitudinal axis, in particular so as to enable desired cut-off lengths to be advanced may be a ram, or better still a drive chain located in the magazine, with either of these two means engaging the last end piece, i.e. the end piece which is furthest from the cutting section.

A drive chain is generally provided with a grab which hooks onto the element end piece, thereby enabling the element to go through a vertical position and also enabling it to be reversed, but any other suitable fastening means could be used.

When the element is put into the cutting position and when it is being cut, it is necessary to go from a reference position from which the element displacement lengths are measured and from which other displacements are controlled (displacements of the side clamps and the carriages) by means of control members.

In accordance with another characteristic of the invention, the reference position is obtained by advancing the element until it bears against a reference plate located in the immediate proximity of the cutting section. Said plate is advantageously constituted by the face of the main side clamp (the side clamp which is closer to the section for cutting off the first end piece) and situated facing the element.

The lengths along which the element is displaced are the cutting length for the first end piece and the cutting length for the rods (fuel element advance lengths) together with possible corrections due to short reverse distances that may be required, for example, to remove the reference plate, to displace a carriage, etc.

For the last-remaining end piece, the element displacement length is the length required to remove said end piece.

The cutting lengths for the end pieces and the rods depend on the type of fuel element: depending on the reactor for which the fuel element was designed, its shape, its disposition, and its mechanical structure may all vary, and indeed the way in which it has been used may also have an effect on the way it dissolves.

The end piece cut-off length is not a very accurate length. The tubes of the rods are not filled with fuel right up to their ends, so there remains a length adjacent each end piece in which there is no fuel and through which cutting may take place.

It is advantageous to cut as close as possible to the fuel while ensuring that no fuel is taken away with the end piece, since the fuel material is highly radioactive and would require the operating authority to proceed with additional and expensive technological means for processing and preparing the end pieces. The cut-off lengths of rod depend mainly on the conditions under which the dissolving reaction takes place after they have been cut-off. In order to ensure that dissolving is as complete as possible so that the shells (the cut-off lengths of non-soluble metal tube) extracted from the dissolver have no fuel left therein, it is necessary for the cut-off ends of the rods to be wide enough open to enable nitric acid to pass therein, and it is also necessary for the cut-off lengths of rod to be short enough to ensure that the time they spend in the dissolver is compatible with the operating throughput of the installation.

The person skilled in the art will select the appropriate cut-off length on the basis of conventional knowledge.

The element is brought to the end piece cutting position by advancing through one end piece cut-off length starting from the reference position, while the side clamp(s) is/are unclamped and the reference plate is removed.

2/Cutting off the first end piece.

This takes place as follows:

the side clamp(s) associated with the end piece cutting section is/are clamped; and the first end piece is cut off and drops into the end piece removal means.

One or more side clamps (e.g. two) may be associated with the end piece cutting section, as described in French patent number 75-27 897.

In accordance with the invention, the end piece is cut off by means of an end piece cutting blade mounted on a carriage for carrying the end piece cutting blade, and more precisely this blade is constituted by the edge of the blade-carrying carriage placed facing the fuel element, said blade co-operating with a fixed backing blade.

The end piece cutting plane is a plane parallel to the cross-section of the fuel element and passing through the edge of the end piece cutting backing blade situated against the fuel element. The end piece cutting section is the intersection of the cross-section of the fuel element with said cutting plane.

Said carriage is displaced in accordance with the invention over the end piece removal means such that the first end piece, when cut off, drops directly into its removal means.

The fuel element without its first end piece then presents the fuel rods on its cross-section for cutting up.

3/Cutting up the rods.

This takes place as follows:

the carriage for carrying the rod-cutting blade is displaced so as to bring its cavity facing the fuel element;

the side clamp(s) associated with the cutting plane(s) is/are unclamped;

the length of fuel element rod selected for cutting off is inserted into the cavity;

the side clamp(s) associated with the rod-cutting plane is/are clamped; and the carriage carrying the rod-cutting blade is displaced so as to cut the rods.

The cycle is repeated until the full lengths of fuel-containing tubes have been cut up and recovered for sending to the dissolver. As a result, the last rod-cutting operation takes place through a portion of the tubes which is not filled with fuel.

The cavity established in the blade-carrying carriage must have a length (size in the cutting direction) and a height (size in a direction perpendicular to the cutting direction and to the longitudinal axis of the fuel element) which are not less than the corresponding sizes of the facing fuel element so as to ensure that the uncompressed cross-section of the fuel element can be inserted into the cavity. The depth of the cavity is not less than the rod cut-off length.

While the fuel element is being inserted into the cavity, one side of the fuel element is put into contact with the wall furthest from the blade so that once the associated side clamp(s) has/have been clamped, the tubes are pressed against said wall where they form a compacted "bale" of touching tubes ready for cutting.

The rod-cutting blade is fixed in the cavity and is disposed so that the cutting direction is parallel with, and in the same direction as, the thrust direction of the side clamp(s) associated with the rod-cutting plane.

Preferably, said blade constitutes one of the walls of the cavity so as to withstand cutting forces better. It is also advantageous for maintenance reasons to design a blade that can be assembled and disassembled remotely.

The rod-cutting blade co-operates for cutting purposes with a fixed backing blade, and as a result said backing blade is at least as tall as the cavity.

The rod-cutting plane is thus constituted by a plane perpendicular to the longitudinal axis of the fuel element and passing through the edge of the backing blade closest to the element, and parallel with carriage displacement. The cutting section is the intersection of the cross-section of the fuel element with said plane.

The rods are then cut inside the cavity. The cut-off pieces of rod are thus located in the cavity which is closed on all sides by the blade, by the wall opposite to the blade, by its top wall, by the fuel element, and by the backing blade as the carriage moves.

The cut-off rods are confined in the cavity and then fall through its bottom opening into the rod removal means which is placed in stationary manner beneath the rod-cutting blade.

More precisely, when the cutting planes for the end pieces and for the rods are constituted by a single plane, i.e. when the blades both co-operate with the same backing blade, and with the carriage carrying the end piece cutting blade moving over the end piece removal means, it is essential, in accordance with the invention, to provide the bottom opening of the cavity with a sloping wall which slopes towards the rod removal means and which serves as a deflector in order to direct the cut-off portions of rod to the appropriate removal means and prevent them from falling into the end piece removal means. It is then advantageous to place the rod removal means as close as possible to the end piece removal means.

However, when the two cutting planes are different, each of the removal means is placed beneath the corresponding cutting plane and a deflector is not necessarily essential.

4/Recovering the last end piece.

After the last length of fuel rod has been cut off, all that remains of the fuel element is the last end piece and the element displacement means acts thereon as does (do) the side clamp(s).

While the side clamp(s) is/are unclamped, the element displacement means is actuated so as to bring the end piece over the end piece removal means, thereby dropping it into said removal means.

The above-described method is now illustrated by means of FIGS. 3a-6f. These figures relate more precisely to cutting up a fuel element placed horizontally and shown as seen from above.

FIGS. 3a-5 show the details of the stages for cutting up an entire fuel element using a single blade-carrying carriage provided with the end piece cutting blade and with the rod cutting blade, whereas in FIG. 6 each of the blades is mounted on a different blade-carrying carriage.

The fuel element 10 (FIG. 3a) comprises a first end piece 11, a last end piece 12, and a plurality of fuel rods 13 therebetween, with the portions of the fuel rods that are filled with fuel lying between lines referenced 14 and 15.

The guide means are represented by a frame 16 and the means for displacing the fuel element along its longitudinal axis are referenced 17. In addition, in order to simplify the drawings, these means are not necessarily reproduced on the other figures.

Figure 3A:
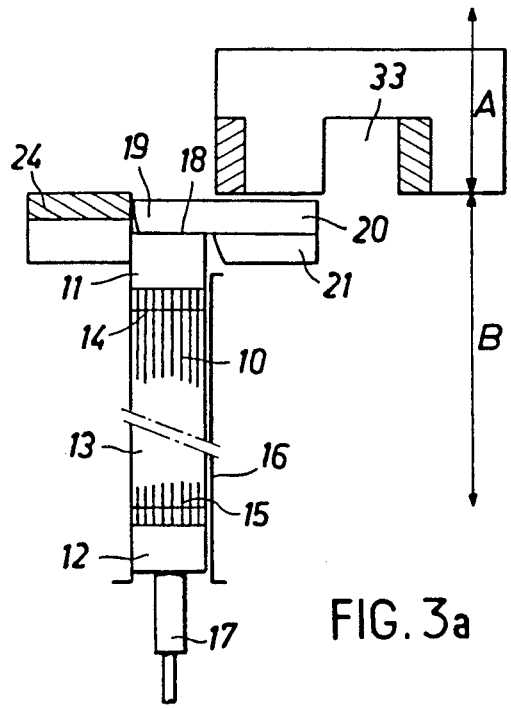
FIGS. 3a–3d, 4a–4d, 5 and 6a–6f show two different implementations of the method in accordance with the invention.
Figure 3B:
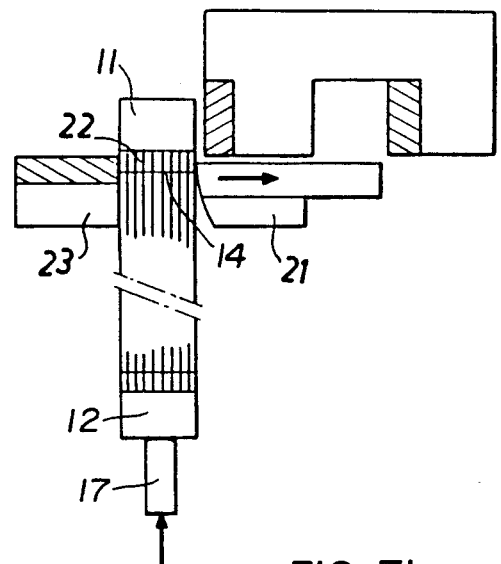

In FIG. 3a, the fuel element is in its reference position with the end 18 of its first end piece being in contact with the face 19 of the main side clamp 20, and with the auxiliary side clamp 21 being unclamped. It would also be possible to show a single side clamp suitably shaped to perform, on its own, the functions of both individual side clamps.

The side clamp 20 is returned to its rest position and the fuel element is advanced by the end piece cut-off length so that the first end piece moves into the cutting position (FIG. 3b) with the line 14 indicating the level of fuel lying outside the cutting section 22 and on the same side thereof as the remainder of the fuel element.

Figure 3C:
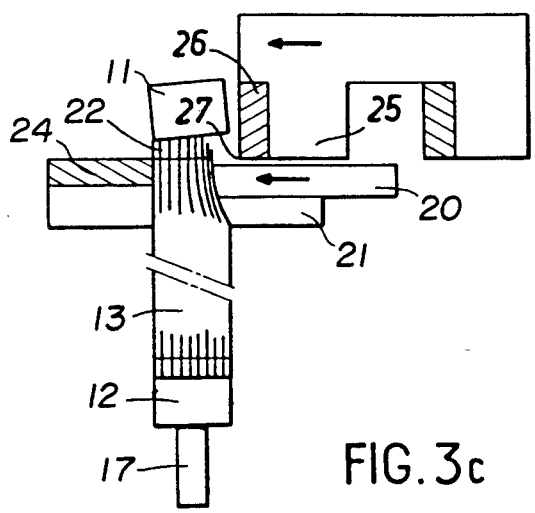

The side clamps are then pressed against the abutment 23 which is constituted, in this case, by the support for the backing blade 24. The tubes are thus pressed together (as shown in FIG. 3c) in the immediate proximity of the cutting section. The mere thrust from the side clamps may, on its own, suffice to pull out some of the tubes 13 from end piece 11.

The blade-carrying carriage 25 is then displaced parallel to the cross-section of the fuel element so that the end piece cutting blade 26 placed on edge 27 of the carriage cuts off the end piece 11 along a cutting section 22 in co-operation with the backing blade 24.

Figure 3D:
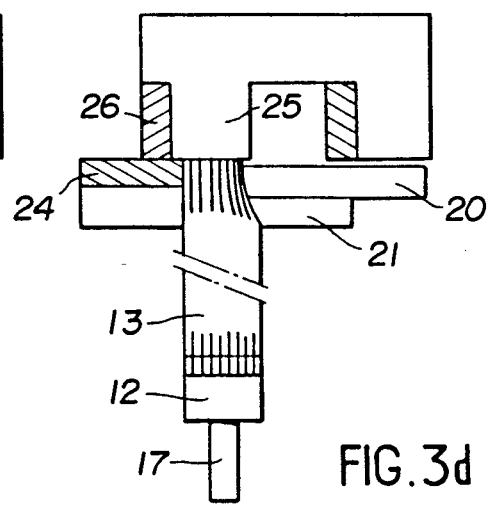

FIG. 3d shows the fuel element with its first end piece removed.

The carriage is then moved (FIG. 4a) so as to bring its cavity 28 located ahead of the rod-cutting blade 29 to a position in which it faces the end of the fuel element so that after the side clamps have been unclamped the element can be advanced into the cavity.

Figure 4A:
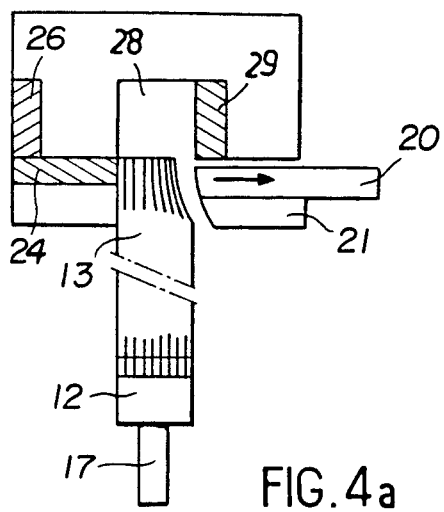
Figure 4B:
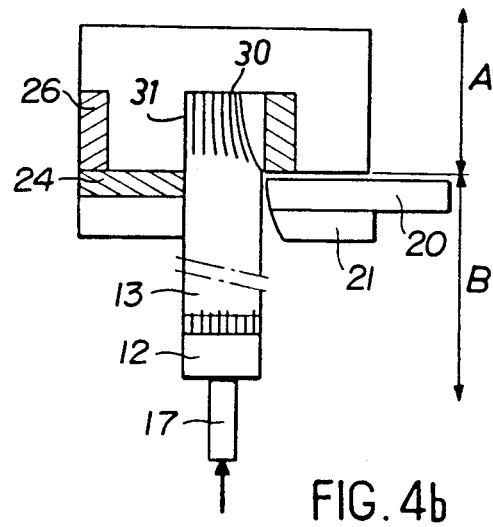

In FIG. 4b, the element has been thrust into the cavity by an amount equal to the desired rod cut-off length. The rods may optionally come into abutment with the far wall 30 of the cavity. It is preferably for the rods to come into contact with the wall 31 of the cavity which is opposite to the blade.

Figure 4C:
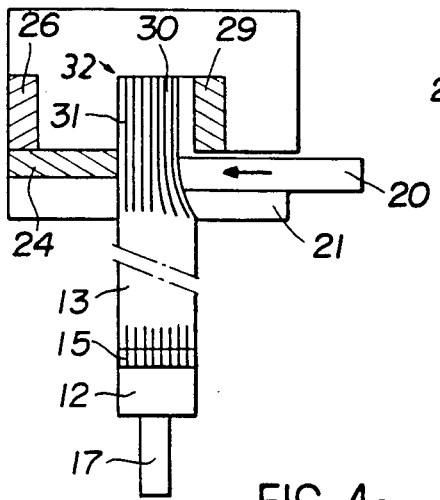
Figure 4D:
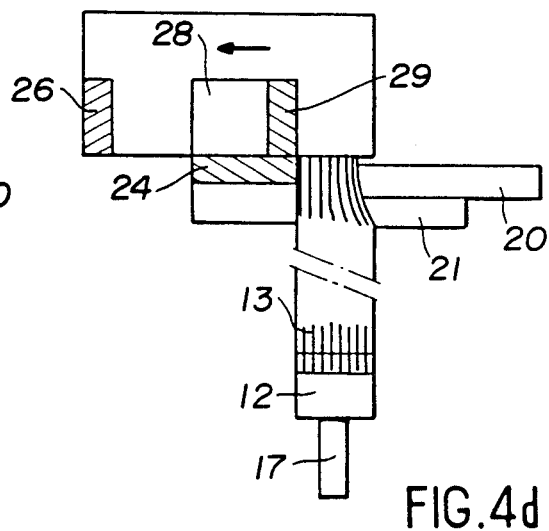

The side clamps are then actuated (FIG. 4c). The fuel element is then compressed in the vicinity of the cutting section with its tubes being pressed against the wall 31.

The carriage is displaced (FIG. 4d) and the blade cuts the rods along cutting section 32 in co-operation with the backing blade 24.

The carriage returns to its rod cutting position (FIG. 4a) and the rod cutting cycle repeats.

When the rod cutting section 32 lies between the rod loading limit (reference 15) and the end piece 12, the blade-carrying carriage does not return to its FIG. 4a position, but instead it returns to its FIG. 3a rest position, thereby releasing a space suitable for passing the end piece.

Figure 5:
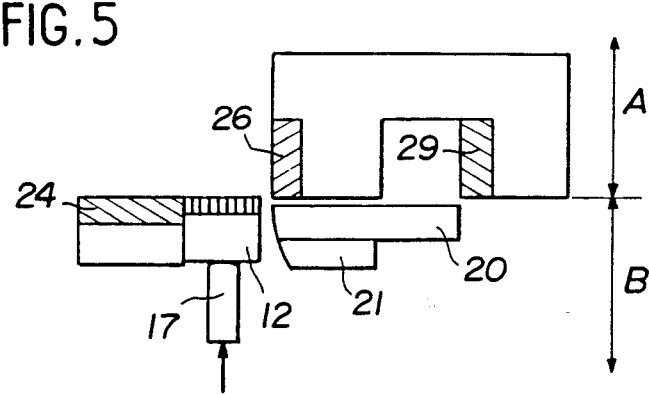

The last end piece is then pushed so as to cause it to fall into the end piece removal means (FIG. 5).

The end pieces fall directly into end piece removal means A. The rods are directed towards rod removal means B by means of the deflector wall 33 mounted over the bottom opening of the cavity (with this wall being shown in FIG. 3a only, for the purpose of simplification).

FIGS. 6a-6f show another implementation of the method in accordance with the invention in which each blade is carried by a distinct blade-carrying carriage.

Figure 6A:
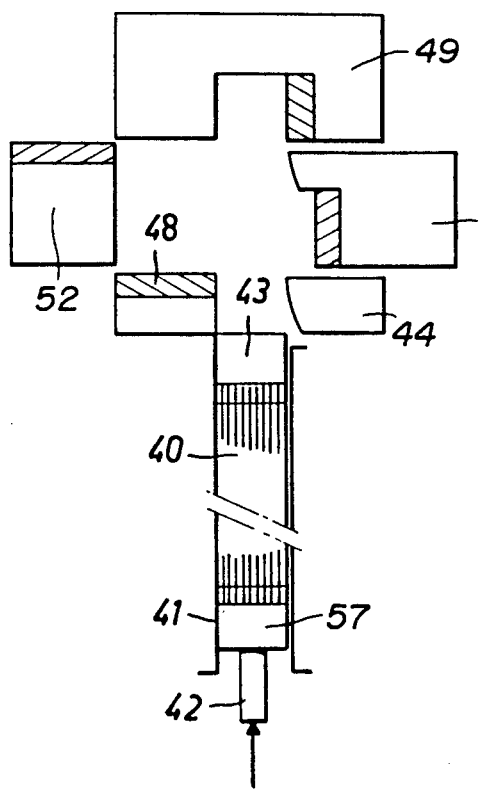

The fuel element 40 is placed horizontally on the support 41 provided with its guide means, and is displaced along its longitudinal axis by the displacement means 42 (FIG. 6a).

The reference position is not shown, but it is advantageously obtained in the same way as in the above-described implementation.

Figure 6B:
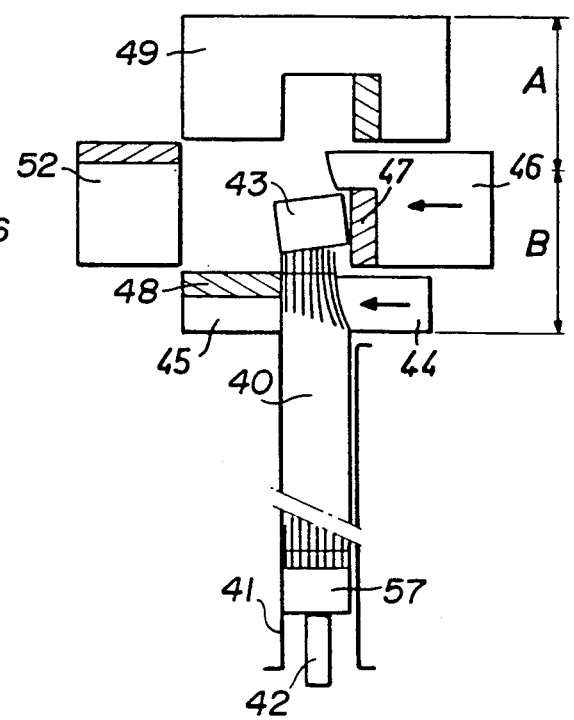

In order to cut off the first end piece 43, the side clamp 44 associated with the end piece cutting plane is clamped against the support 45 for supporting the backing blade for cutting off the end piece (FIG. 6b).

A single side clamp is shown having a leading face which is curved in shape to impart the desired curvature to the fuel element.

Figure 6C:
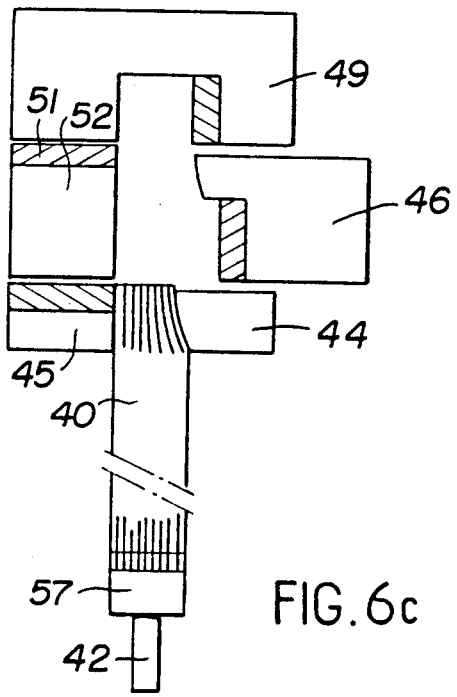

The carriage 46 carries the end piece cutting blade 47 at its leading edge and this co-operates with the backing blade 48 and the cut-off end piece falls into end piece removal means B placed beneath the end piece cutting plane (FIG. 6c).

With side clamp 44 in the unclamped position (FIG. 6d), the fuel element is advanced into the cavity 48 in the carriage which carries the rod-cutting blade 50. This blade co-operates for cutting purposes with a backing blade 51 mounted on a support 52 (FIG. 6e).

When the first end piece is being cut off, the support 52 is at a distance from the longitudinal axis of the fuel element so that the carriage 46 can move to cut off the end piece and so that the end piece can fall away.

When cutting the rods, the support 52 is moved in closer so as to place the backing blade 51 against the fuel element to be cut up. This disposition also serves to guide the fuel element as it is being advanced towards the carriage 49.

In order to support the fuel element which extends over a fairly long length away from its support, and also in order to prevent the rods from splaying apart, the support 52 may be provided with a support plate (not shown in the figures) disposed in line with the support. Thus, since the support 52 is a moving support, the supporting plate moves into place only when the rods are being cut up and does not impede the falling away of an end piece.

In the same way as in the preceding variant, the fuel element is inserted into the cavity along the desired rod cutting length and it preferably comes into contact with the wall 53 of said cavity.

The side clamp 54 associated with the rod-cutting plane is clamped so as to cause the rods to constitute a compact "bale" 55 within the cavity.

In this variant, the carriage 46 carrying the end piece cutting blade also carries the side clamp 54 associated with the rod-cutting plane. These two components could equally well have been separate. Naturally, the end piece cutting blade 47 is placed on the front face of the carriage 46 set back from the end face of the side clamp 54.

Figure 6D:
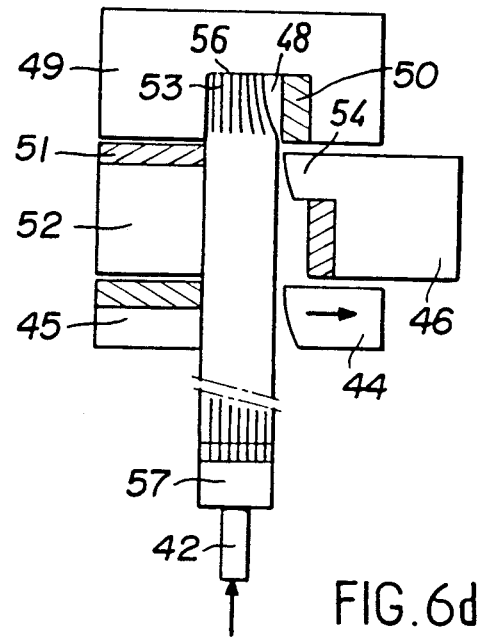
Figure 6E:
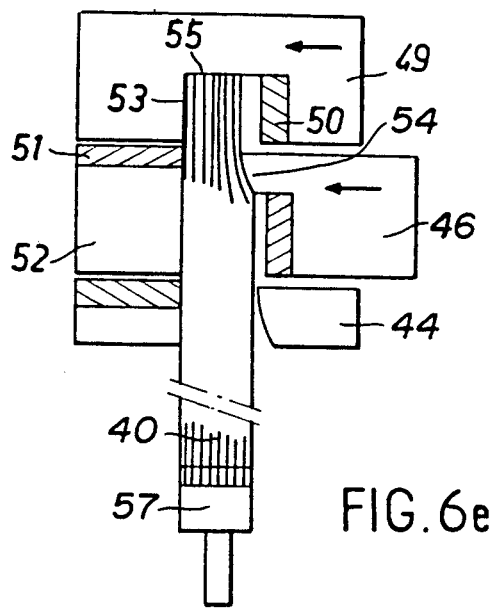
Figure 6F:
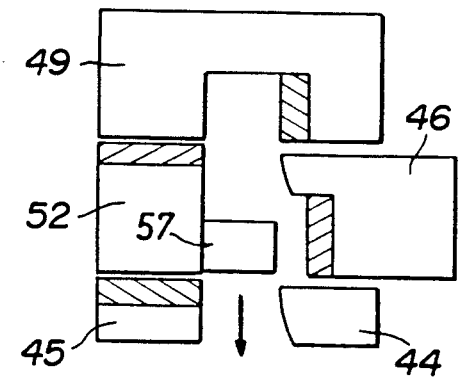

FIG. 6d shows the rods in contact with the wall 56, i.e. it shows a cavity having the same depth as the rod cut-off length. Although this disposition is highly advantageous, it is not essential.

The cut-off rods fall into removal means A disposed beneath the rod-cutting plane. Advantageously, and in order to provide additional safety, the bottom opening of the cavity may be provided with a deflector wall, but in this disposition that is not essential, since the two removal means may be far enough apart.

When the rods have been cut up, the last end piece 57 (FIG. 6f) is brought over end piece removal means B (supposing it was not there already) and falls into said means.

SUMMARY OF THE APPARATUS INVENTION

The present invention also provides apparatus for implementing the above-described method. The apparatus in accordance with the invention comprises:

a support for supporting the fuel element whose cross-section is being presented for cutting;

means acting on said fuel element and controlled in such a manner as to cause the element to advance by desired lengths in the direction of its longitudinal axis;

at least one moving side clamp placed in immediate proximity of each cutting plane and facing an abutment, said side clamp serving to compress the portions of the fuel element placed between the side clamp and the abutment, with cutting taking place immediately behind the compressed portions of the fuel element;

means for cutting up rods and for cutting off end pieces;

means for removing the end pieces and means for removing cut-up lengths of rod and directing them to a dissolver; and automatic control means;

the apparatus being characterized in that the means for cutting up the rods is distinct from the means for cutting off the end pieces and is received in or at the limit of a cavity such that the section along which the rods are cut lies within or at the limit of said cavity, said cavity including a bottom opening through which the cut-off lengths of rod are removed, with the means for removing the end pieces and the means for removing the lengths of rod being distinct and fixed beneath the apparatus.

a preferred embodiment of this apparatus for implementing the method of the invention in its advantageous disposition of the fuel element being cut at a single fixed cutting station, has the following features:

the means for cutting off the end pieces is constituted by an end piece cutting blade carried by the leading edge of a carriage for carrying the end piece cutting blade (said leading edge being leading in the direction of cutting displacement of the carriage);

the means for cutting up the rods is constituted by a rod-cutting blade situated in a hollow provided in the face of a carriage carrying the rod-cutting blade, said blade being placed in such a manner as to leave a cavity ahead of its cutting face (ahead in the cutting direction) with the length and height of the cavity being not less than the corresponding dimensions of the facing fuel element, said cavity having a depth which is not less than the lengths of the rods to be cut off;

said cavity including a bottom opening through which the cut-off lengths of rod are removed towards the rod-removal means placed in the vicinity of the rod-cutting plane;

the carriages for carrying the end piece cutting blade and the rod-cutting blade being displaced over guide means disposed in such a manner that the carriage for carrying the end piece cutting blade moves over the end piece removal means; and said removal means are fixed beneath said apparatus.

In order to ensure that the blade withstands cutting forces better, the blade is preferably placed against one of the walls of the cavity.

Advantageously, the blades used have a sloping cutting face: preferably they comprise a staircase arrangement of knives, but it is also possible to provide a sawtooth disposition. All of these blades improve the distribution of cutting forces. Optimization based on calculation and on testing gives rise to a particularly suitable shape, for example to a blade comprising a plurality of knives at varying distances apart depending on the positions of the knives.

It is also advantageous to provide a blade which can be remotely mounted and dismounted. Since irradiated fuel elements are cut up in a closed cell which is inaccessible to personnel, and since worn blades need replacing, it is preferable for safety and handling reasons to be able to change the blade in situ rather than having to remove from the cell the entire carriage carrying the rod-cutting blade.

To this end, and in accordance with an optional feature of the present invention, the blade is fixed on a support. The shape of the support is suitable for enabling it to be engaged exactly in a slot provided in one of the faces of the carriage that carries the rod-cutting blade, and which extends over the entire height of said face. The said support may be mounted and dismounted remotely and remotely operable locking means serve to lock it to the carriage.

The blade-carrying carriages moves on guide means which may be rails, for example, for use with a wheeled carriage. Means may also be provided to prevent lateral displacement of the carriage during cutting.

An embodiment of the apparatus which is particularly suitable for industrial exploitation and which implements the cutting method in accordance with the invention using the same cutting plane for cutting off end pieces and for cutting up fuel rods comprises a single blade-carrying carriage having the end piece cutting blade on its front edge (on the fuel element side) and having its rod-cutting blade located in the cavity facing the fuel element, with both blades co-operating with the same backing blade situated against the fuel element to be cut.

In such apparatus, since the removal means are fixed and located beneath the cutting plane, and since the blade-carrying carriage moves over the end piece removal means, the bottom opening of the cavity is provided with means for directing the cut-off lengths of fuel rod towards the fuel rod removal means. One simple means for this purpose is constituted by a fixed metal wall sloping towards the rod removal means.

Naturally, it is advantageous to place the rod removal means as close as possible to the rod-cutting plane. In the advantageous above-described variant in which the rod-cutting plane is the same as the end piece cutting plane, the cutting plane is situated over the end piece removal means and the rod removal means is adjacent to the end piece removal means, with the guide means being so disposed that the carriage moves as close as possible to the rod removal means in order to ensure that the rods are easily removed.

Preferably, two side clamps are associated with the end piece cutting plane, with the main side clamp serving as a reference plate.

In an advantageous embodiment of these side clamps, the main side clamp comprises a rectangular block which is hollowed out so as to form a shoulder and a face which is parallel to the cross-section of the fuel element. The face serves as the reference plate. Its length is such that when the shoulder comes into abutment against a fuel element (or against a support which is in contact with a fuel element), the entire length of the end piece comes into contact with said face.

MORE DETAILED DESCRIPTION OF THE APPARATUS INVENTION

FIGS. 7 to 10 show an embodiment of the apparatus in accordance with the invention which is particularly advantageous for industrial exploitation, and in which a single blade-carrying carriage supports the blade for cutting off the end pieces and the blade for cutting up the rods, which blades co-operate with a common backing blade.

Figure 7:
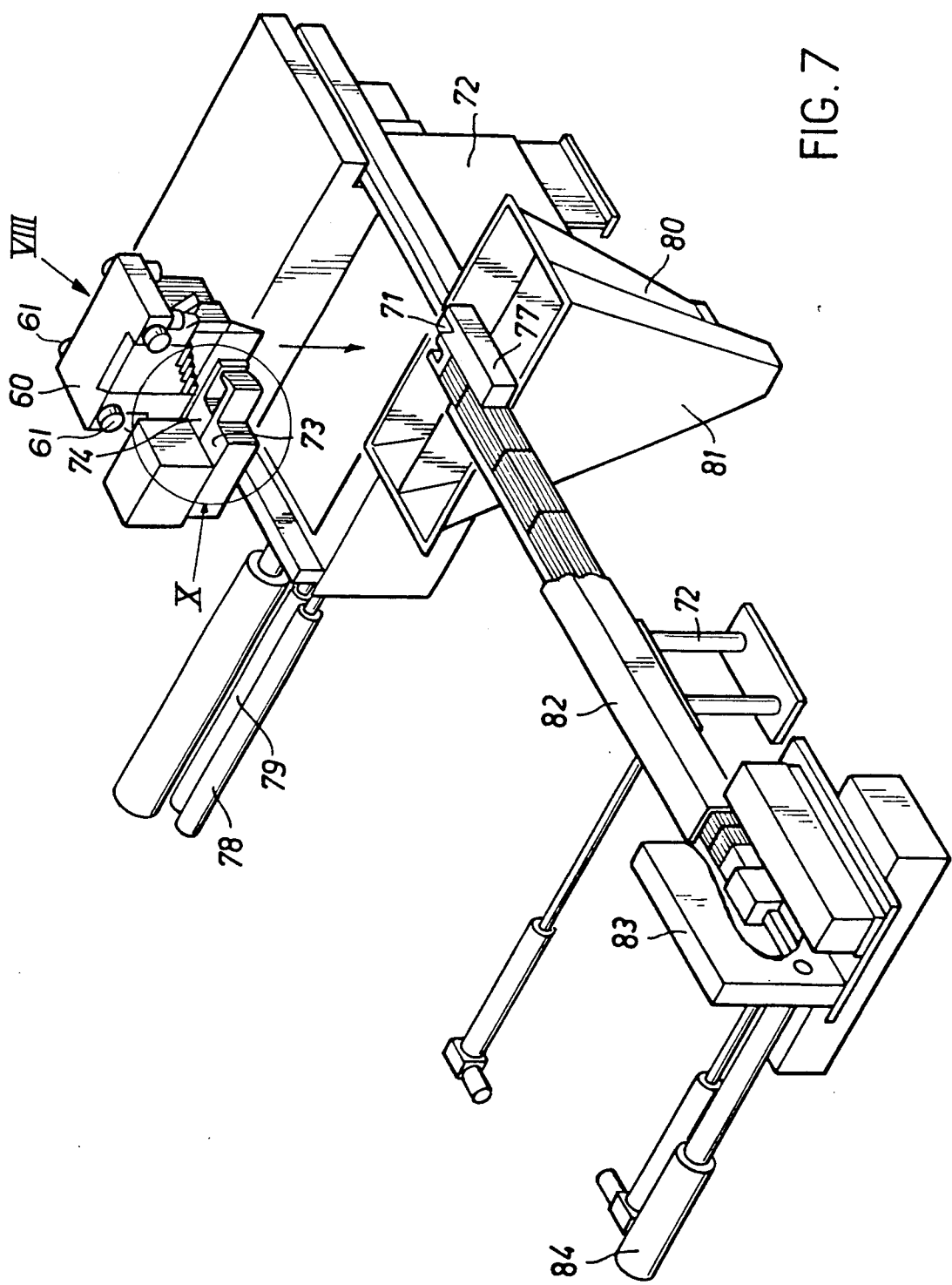
FIGS. 7, 8, 9a, 9b and 10 show one embodiment of apparatus in accordance with the invention.

On FIG. 7, the parts of the apparatus have been slightly displaced in the upwards direction so as to show up their structure more clearly, and in particular so as to show the structure of the blade-carrying carriage.

The blade-carrying carriage 60 is constituted by an approximately rectangular mass of steel having wheels 61 enabling it to be displaced along guide means which are constituted, in this case, by rails which are not shown in the figures.

Preferably, and as shown in the figures, the carriage is suspended from the guide means and this disposition leaves unemcumbered space in the vicinity of the removal means and also reduces any risk of splinters or dust becoming deposited on the guide means, which would be more likely if the guide means were below the carriage.

Figure 8:
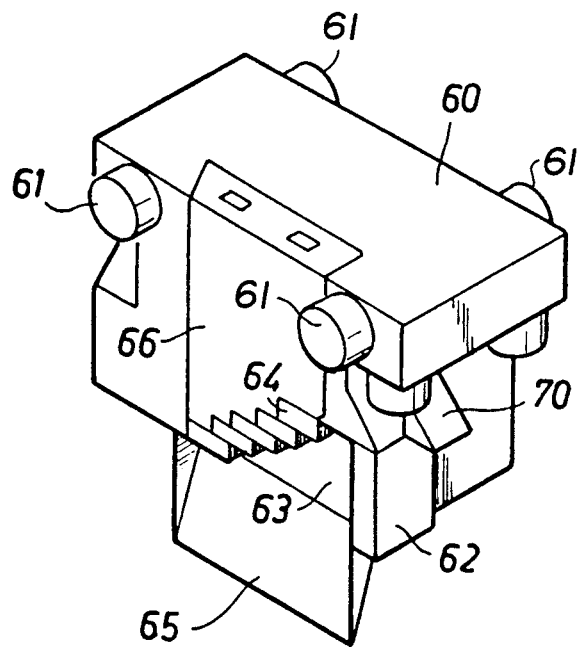

FIG. 8 shows the blade-carrying carriage in greater detail. The end piece cutting blade 62 is constituted by a piece of hard steel firmly fixed to the front edge of the carriage.

In the embodiment shown, the carriage 60 can move back-and-forth along one direction only, perpendicular to the longitudinal axis of the fuel element, with the end piece cutting blade 62 then being placed on the same side thereof as the cavity 63. The cavity 63 includes a slot containing a rod-cutting blade 64 which leaves an empty cavity 63 of sufficient size in front of the blade 64 to enable a fuel element to be inserted therein over a length which is not less than the length to be cut off the rods.

Figure 9B:
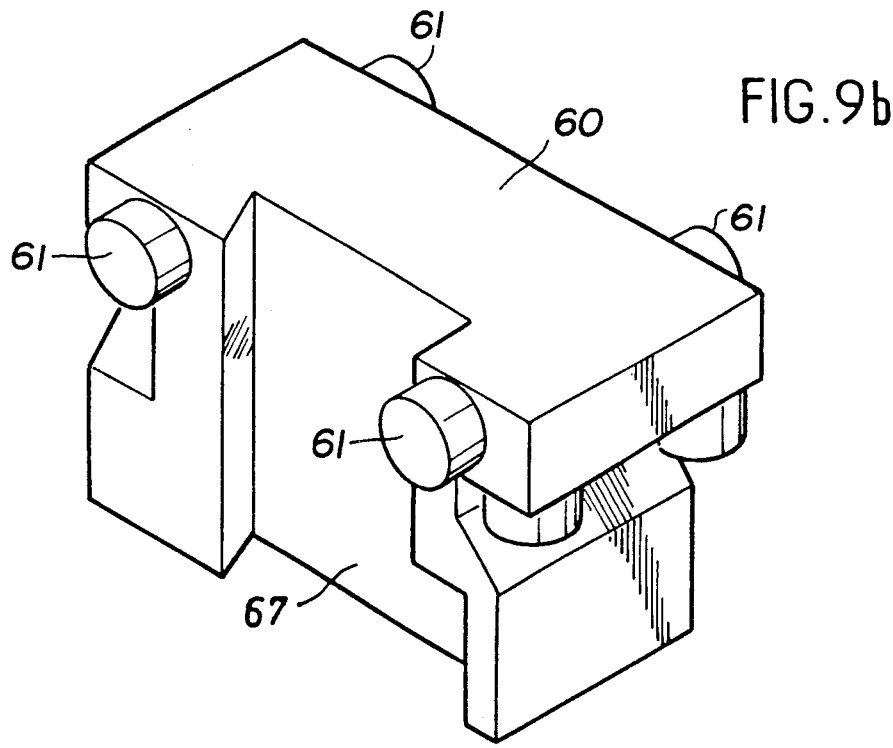
Figure 9A:
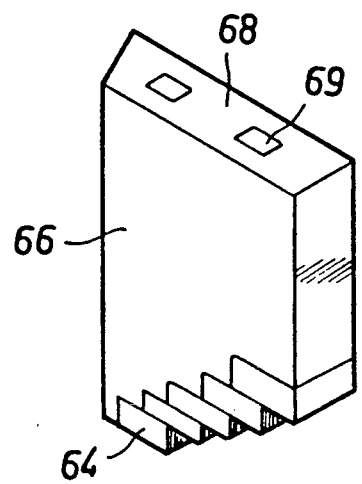

The bottom opening of the cavity is provided with a sloping wall 65 comprising a single metal sheet and constituting a deflector for the cut-off lengths of rod. It is particularly advantageous to provide a removable rod-cutting blade capable of being put into place and removed from a distance by remote manipulators. In this advantageous disposition of the invention (FIGS. 9a and 9b), the rod-cutting blade 64 is firmly fixed to one end of a blade support 66 (FIG. 9a), which support is itself cut-out from the blade-carrying carriage so as to be exactly received in the slot 67 from which it was cut out (FIG. 9b).

The locking and unlocking means may be various different kinds, and for ease of access they should be controlled from the top face 68 of support 66. They may be constituted, for example, by bolts controlled from a rod engaging in orifices 69 for pushing or turning the bolts depending on the form of locking chosen.

Also for the purpose of facilitating handling, the blade-carrying carriage may be provided with means for raising the carriage, for example lugs 70 (see FIG. 8) enabling the carriage to be lifted, for example by means of a sling from a travelling crane.

Both blades co-operate with the same backing blade 71 fixed to the frame 72 as close as possible to the blade-carrying carriage in order to obtain as clean a section of cut as possible.

The backing blade is simply constituted by a piece of hard metal, which is preferably mounted on a backing blade support 77 (FIG. 7), said support then being placed facing the side clamp(s) so that the fuel element is clamped by said side clamp(s) thrusting it against said support.

Figure 10:
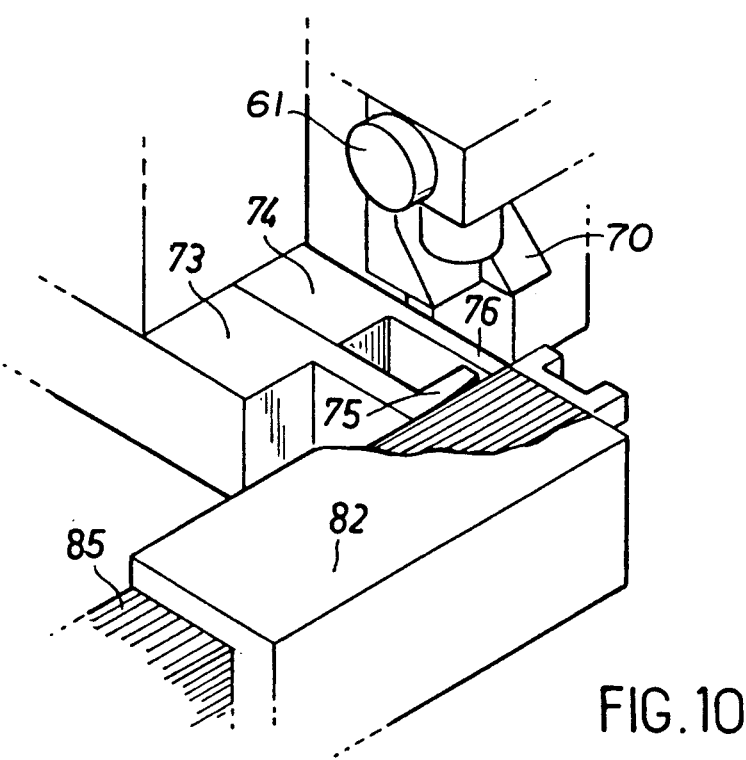

FIG. 10 shows clamping being provided by two side clamps: a main side clamp 74 and a secondary side clamp 73. In order to constitute the reference plate, the main side clamp has a face 76 whose length is equal to the side of the fuel element plus the thickness of the curved L-shaped end 75 of the secondary side clamp.

The apparatus can be described in its rest position with reference to FIG. 10. The curved portion 75 of the secondary side clamp 73 is in contact with the end piece, and the main side clamp 74 is advanced so that its end abuts against the backing blade support or against the backing blade itself. In a particularly advantageous disposition for the apparatus, said main side clamp 74 is then also in abutment against the curved portion 75, thus providing additional safety and the fuel elements can be brought into abutment thereagainst. The displacement of each side clamp is under the control of a corresponding actuator 78, 79, which may be controlled from servo-control means. The displacement of the carriage is also controlled by servo-control means and may be obtained by a suitable motor, for example.

The means for removing end pieces and rods are constituted by respective hoppers 80 and 81. These hoppers are located side-by-side and are disposed so that the blade-carrying carriage moves over the end piece removal means and as close as possible to the common wall between the hoppers.

In the preferred embodiment, as shown in FIG. 7, the end piece hopper 80 is situated in front of the rod hopper 81 (in front in the direction of fuel element advance), and as a result the end piece hopper 80 is less visible in FIG. 7. The common wall between the hoppers is situated exactly beneath the cutting plane. The side clamps 73 and 74, the backing blade 71 together with its support 77, and the magazine containing the fuel element (all of which are mounted on the frame 72) and then situated above the rod hopper.

The frame 72 supports the set of side clamps 73 and 74, the backing blade 71 together with its support 77, the support for holding the fuel element, and the means for displacing the fuel element.

In FIG. 7, the support which maintains the fuel element in a horizontal position (as shown in the figure) is constituted by a magazine 82 containing the fuel element 85 and provided with a driving chain 83 which is controlled at 84 by servo-control means.

The invention is not limited to the particular embodiment described.

Variants of the claimed apparatus may be designed, in particular variants in which each blade is carried by a different blade-carrying carriage moving on common guide means (in which case the blades co-operate with the same backing blade) or on independent guide means in which case the backing blades are separate as well. In the first case, the end piece removal means is placed beneath the end piece cutting plane, the rod removal means is placed in the immediate vicinity thereof, and the cavity of the carriage carrying the rod-cutting blade is provided with means for deflecting the cut-off lengths of rod. In the second case, each removal means is placed beneath the corresponding plane of cut.

These variants are more difficult to use in a nuclear environment: they require more mechanics and some of the mechanical means which are required for operation of the apparatus but which do not participate directly in the cutting, e.g. the actuators, cannot always be located, in these variants, outside the shearing cell, which would be advantageous in order to enable maintenance to be performed away from contamination.

Apparatus in accordance with the invention can be used to cut up an entire fuel element. Naturally, it could also be used to cut up a fuel element from which the end pieces have already been removed, or to cut up single rods, or to cut up bales of rods, etc.

I claim:

1. A method for cutting an irradiated fuel element having a longitudinal axis and comprising a plurality of fuel rods arranged between first and second end pieces, said method comprising the steps of:
   (a) supporting said fuel element with its longitudinal axis being substantially horizontally aligned;
   (b) moving the fuel element a predetermined distance in a direction of its longitudinal axis toward a cutting location;
   (c) clamping the fuel element at a location intermediate the end pieces and adjacent to the cross-section of the fuel element to be cut;
   (d) providing a movable end piece cutting blade and a movable rod cutting blade and at least one backing blade;
   (e) positioning the backing blade adjacent one side of the fuel element, one edge of said backing blade lying in a cutting plane;
   (f) advancing the fuel element so that the cross-section to be cut is aligned with said cutting plane;
   (g) moving the end piece cutting blade toward said backing blade for severing the first end piece adjacent to the cutting plane from the remainder of the fuel element whereby the first end piece is caused to fall into a stationary end piece removal means;
   (h) providing a movable member having a cavity and arranging said rod cutting blade within said cavity, said cavity having a depth at least equal to the length of the fuel element rods being cut;
   (i) moving the movable member to bring the cavity into alignment with the fuel element;
   (j) unclamping the fuel element;
   (k) advancing the fuel element to move a portion of the fuel element rods beyond said cutting plane and into said cavity sufficient to obtain the desired rod lengths when cut;
   (l) clamping the fuel element rods at a location adjacent to the cross-section to be cut through said fuel element;
   (m) moving the movable member having the cavity and rod cutting blade along said cutting plane in a direction transverse to the longitudinal axis of the fuel element and toward the backing blade, whereby the section of fuel element rods within said cavity are severed from the remaining portion of the fuel element by said rod cutting blade and diverted into a fixed fuel rod removal means.

2. A method according to claim 1, wherein the fuel element is inserted into the cavity in such a manner that one of its sides is substantially in contact with a wall of the cavity opposite to the rod cutting blade so that during clamping the fuel rods are pressed against said wall.

3. A method according to claim 1, wherein the end pieces and the rods are cut in the same cutting plane.

4. The method of claim 1 wherein steps (f) and (i) through (m) are repeated until all of the fuel element rods have been severed from said first and second end pieces; and
   advancing the second end piece beyond the cutting plane whereupon the second end piece is caused to fall into the stationary end piece removal means.

5. The method of claim 1 wherein the step of severing a section of fuel element rods further comprises the step of deflecting the severed section of fuel element rods from the moving member cavity into the fixed fuel rod removal means as the fuel element rods are dropped from a bottom open end provided in the movable member and communicating with the cavity.

6. The method of claim 5 wherein the step of deflecting fuel element rods from the cavity into the fixed fuel rod removal means further comprises the step of providing a sloping wall over the bottom open end for directing the rod sections severed from the remainder of the fuel element into the fixed fuel rod removal means.

7. The method of claim 1 further comprising the steps of:
   providing a movable carriage having a front edge;
   arranging the end piece cutting blade at the front edge of the movable carriage, said front edge cooperating with the backing blade;
   holding said backing blade fixed during the cutting operations; and
   moving the carriage over the end piece removal means as the end piece is severed from the remainder of the fuel element causing the severed end piece to fall into the end piece removal means.

8. The method of claim 1 further comprising the steps of:
   providing a movable carriage;
   arranging the movable member and rod cutting blade on said carriage and moving said carriage during step (i) to place the cavity in position to receive fuel elements and thereafter moving the carriage in accordance with step (m) for severing a section of rods arranged in said cavity from the remainder of the fuel element by moving said carriage toward said backing blade which is maintained fixed during the rod cutting operation.

9. The method of claim 1 wherein the second end piece is moved in the direction of said longitudinal axis past said backing blade to be deposited in said stationary end piece removal means after the fuel element rods have been severed therefrom.

10. The method of claim 1 wherein the end piece cutting blade and the rod cutting blade and associated movable member are arranged upon a common carriage, said method further comprising the steps of:
   moving the carriage transverse to said fuel element longitudinal axis so that the end piece cutting blade, which is arranged at an end of said common carriage closer to said backing blade, cooperates with the backing blade to sever the end piece from the associated fuel rod;
   selectively advancing said common carriage towards said backing blade for severing the rods confined within said cavity from the remainder of the fuel element, said cavity maintaining the fuel rods and any dust particles and other matter resulting from the cutting and clamping operations confined to said cavity until the fuel rods in said cavity are dispensed into the fixed fuel rod removal means; and
   deflecting both the severed rods and any dust particles collected within the cavity into the fixed rod removal means.

11. The method of claim 1 wherein the cavity in said movable member and the rod cutting blade enclose a section of rod elements except for a side opening provided in the movable member for receiving the rods and a bottom opening provided in the movable member for releasing severed rods, said side and bottom openings communicating with said cavity, step (k) further including the step of aligning the fuel element rods so that the sides thereof engage a wall of the cavity opposite the rod cutting blade so that the fuel element rods are pressed against said cavity wall.

12. The method of claim 1 further comprising the step of providing a reference plate and advancing the fuel element until it abuts said reference plate, from which position its displacement lengths are subsequently calculated.

13. The method of claim 1 further comprising the steps of:
   providing a movable reference plate;
   moving the reference plate across the path of movement of the fuel element;
   moving the face of the fuel element closer to the cutting location against said reference plate to facilitate a determination of the displacement length of the fuel element preparatory to each cutting operation.

14. The method of claim 13 wherein the clamping step further includes providing a clamping plate for clamping the fuel element between the reference plate and a stationary surface; and
   moving the reference plate in front of the fuel element preparatory to a cutting operation and moving the fuel element into engagement with the reference plate transverse to the element longitudinal axis to facilitate calculation of displacement distances to assure cutting of the desired lengths.

15. The method of claim 1 wherein the end piece and rod cutting blades are arranged on separate movable carriages, each carriage being moved independently to perform its cutting operation.

16. The method of claim 15 comprising the step of providing the member having the cavity on the carriage having the rod cutting blade.

17. A method for cutting an irradiated fuel element having a longitudinal axis and comprising a plurality of fuel rods arranged between first and second end pieces, said method comprising the steps of:
   (a) supporting said fuel element with its longitudinal axis being substantially horizontally aligned;
   (b) moving the fuel element a predetermined distance in a direction of its longitudinal axis toward a cutting location;
   (c) clamping the fuel element at a location intermediate the end pieces and adjacent to the cross-section of the fuel element to be cut;
   (d) providing a movable end piece cutting blade and a movable rod cutting blade and first and second backing blades;
   (e) positioning the first backing blade adjacent one side of the fuel element, one edge of said first backing blade lying in a cutting plane;
   (f) advancing the fuel element so that the cross-section to be cut is aligned with said cutting plane;
   (g) moving the end piece cutting blade toward said first backing blade for severing the first end piece adjacent to the cutting plane from the remainder of the fuel element whereby the first end piece is caused to fall into a stationary end piece removal means;
   (h) providing a movable member having a cavity and arranging said rod cutting blade within said cavity, said cavity having a depth at least equal to the length of the fuel element rods being cut;
   (i) moving the movable member to bring the cavity into alignment with the fuel element;
   (j) unclamping the fuel element;
   (k) advancing the fuel element to move a portion of the fuel element rods beyond said cutting plane and into said cavity sufficient to obtain the desired rod lengths when cut;
   (l) clamping the fuel element rods at a location adjacent to the cross-section to be cut through said fuel element;
   (m) moving the movable member having the cavity and rod cutting blade along said cutting plane in a direction transverse to the longitudinal axis of the fuel element and toward the second backing blade, whereby the section of fuel element rods within said cavity are severed from the remaining portion of the fuel element by said rod cutting blade and diverted into a fixed fuel rod removal means.

18. The method of claim 17 wherein both of said backing blades are held stationary.

19. Apparatus for cutting an irradiated fuel element having a longitudinal axis and which is comprised of a plurality of fuel rods arranged between and joined to first and second end pieces, said apparatus comprising:
   means for supporting the fuel element whose cross-section is being presented for cutting so that the longitudinal axis of the fuel element is substantially horizontally aligned;
   means for moving said fuel element in the direction of its longitudinal axis along said means for supporting and toward a cutting plane;

clamping means positioned adjacent said cutting plane and having a first position to allow free movement of a fuel element between said clamping means and a second position for compressing the fuel rods of a fuel element positioned between said clamping means;

means for cutting up rods and means for cutting off end pieces;

end piece collection means for receiving severed end pieces;

rod collection means for receiving severed lengths of rods and for directing the rod lengths toward a dissolver;

a member having a cavity for receiving a portion of the length of said rods, said cavity receiving said means for cutting up rods and having a side opening for receiving the rods in said cavity and a bottom opening for enabling cut rod sections to drop from said cavity into said rod collection means;

said means for cutting off end pieces and said means for cutting up rods being movable transverse to said longitudinal axis for respectively severing end pieces and rod sections from said fuel element.

20. Apparatus according to claim 19, wherein the servered lengths of rods are directed towards the rod collection means by a wall which slopes towards the rod collection means and which is placed at the bottom opening of the cavity.

21. Apparatus according to claim 26, wherein the carriage means for carrying the means for cutting up rods and the means for cutting off end pieces move over guide means situated respectively over the end piece collection means and rod collection means.

22. Apparatus according to claim 19, wherein two side clamps are associated with the cutting plane, one of said two side clamps also constituting a reference plate for accurately locating the position of the fuel element.

23. Apparatus according to claim 19, wherein the rod-cutting means include a slanting cutting face.

24. Apparatus according to claim 19, wherein the rod-cutting means include knives disposed in a staircase configuration.

25. Apparatus according to claim 19, wherein the rod-cutting means include knives disposed in a sawtooth configuration.

26. The apparatus of claim 19 further comprising movable carriage means supporting both said means for cutting off end pieces and said means for cutting up rods, said carriage means being movable in a direction transverse to said longitudinal axis.

27. The apparatus of claim 26 wherein said carriage means has forward and rearward ends;

said means for cutting off end pieces being arranged at said forward end and said means for cutting up rods and the cavity in the movable member being arranged intermediate said forward and rearward ends;

said carriage means being positioned to one side of the path of movement of a fuel element; and backing means being positioned on a side of said path of movement of a fuel element opposite that of said carriage means whereby upon movement of said carriage means in a first direction toward and across said path of movement, said forward end moves toward said backing means ahead of said rearward end as said carriage means moves in the first direction, said carriage means being movable in a second direction opposite said first direction preparatory to a subsequent cutting operation.

28. Apparatus according to claim 19 wherein:

said means for cutting off end pieces comprises an end piece cutting blade carried by a leading edge of a first carriage for carrying the end piece cutting blade, said leading edge being leading when the carriage is moved in a first direction for cutting a fuel element;

backing means;

said means for cutting up rods comprising a rod cutting blade arranged in the cavity of said member; said member being arranged on a second carriage carrying said rod cutting blade, said rod cutting blade being arranged in said cavity such that the fuel rods in the cavity move toward said backing means in advance of said rod cutting blade during movement of the second carriage in a first direction;

the size of said cavity being sufficient to accommodate the cross-section of the fuel element and having a depth sufficient to receive a longitudinal portion of the fuel element which is at least equal in length to the portion to be severed from the remainder of the fuel element.

29. The apparatus of claim 28 wherein the first and second carriages respectively receiving said end section cutting blade and said rod cutting blade and the member having the cavity are joined together.

30. The apparatus of claim 28 wherein said first carriage supporting said end piece cutting blade is displaced in a direction of the longitudinal axis relative to said second carriage supporting said rod cutting blade and said member having the cavity;

said rod collection means and end piece collection means being similarly displaced relative to the longitudinal axis of said fuel element so as to respectively receive end pieces and rods.

31. The apparatus of claim 19 wherein said member having the cavity further comprises deflection means for deflecting rods dropping from said cavity through a bottom opening in said member communicating with said cavity and moving the rods toward said rod collection means.

32. The apparatus of claim 19 wherein said clamping means comprises first and second clamping means;

one of said first and second clamping means comprising a reference plate movable across the path of movement of a fuel element and being positioned adjacent the cutting plane to enable the face of the fuel element closer to said cutting plane to engage said reference plate and thereby facilitate calculation of displacement lengths for accurately cutting said fuel element into the desired lengths.

33. The apparatus of claim 19 wherein said means for cutting up rods includes rod cutting blade receiving means and rod cutting blade means removably mounted within said blade receiving means to facilitate removal and replacement of said rod cutting means.

34. The apparatus of claim 33 wherein said blade receiving means comprises a blade carrying carriage assembly having a blade receiving slot;

said slot being provided in one face of said blade carrying carriage assembly; and locking means being capable of being operated from a distance for locking said rod cutting blade means within said blade receiving slot.

* * * * *